(12) United States Patent
White et al.

(10) Patent No.: US 6,607,183 B1
(45) Date of Patent: Aug. 19, 2003

(54) IMPLEMENT JACK LOCK-OUT DEVICE

(75) Inventors: Dennis L. White, Lancaster, PA (US); John H. Merritt, New Holland, PA (US)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 10/197,815

(22) Filed: Jul. 19, 2002

(51) Int. Cl.⁷ .................................................. B66F 3/00
(52) U.S. Cl. ...................................................... 254/420
(58) Field of Search ................................. 254/420, 419, 254/424, 425, 98, 103, DIG. 3

(56) References Cited

U.S. PATENT DOCUMENTS

| | | |
|---|---|---|
| 2,127,359 A | 8/1938 | Harley |
| 4,219,232 A | 8/1980 | Kouth |
| 4,898,400 A | 2/1990 | Elkins |
| 5,067,692 A * | 11/1991 | Nudd et al. ................. 254/420 |
| 5,253,891 A | 10/1993 | Carlin et al. |
| 5,553,825 A | 9/1996 | Rasmussen |
| 5,625,335 A | 4/1997 | Kelly |
| 5,931,446 A | 8/1999 | Vandelinde |
| 6,099,052 A * | 8/2000 | Spitzley .................... 292/336.3 |
| 6,206,401 B1 | 3/2001 | Osterback |
| 6,367,589 B1 | 4/2002 | Lausch et al. |

* cited by examiner

Primary Examiner—Robert C. Watson
(74) Attorney, Agent, or Firm—John William Stader; Rebecca L. Henkel

(57) ABSTRACT

A detachable jack assembly for attaching to a hitch, including a leg having a first member movably connected to a foot member; a crank assembly disposed on the first member and having a rotatable arm, the crank assembly operably connecting the first member to move the foot member relative to the first member when the arm is rotated; an attachment member disposed on the first member and having a pin hole formed therein; a pin configured to fit in the pin hole; and a lock-out assembly disposed on the attachment member, including a bar member biased to a first position and movable to a second position, wherein the rotation of the rotatable arm is limited by the bar member when the bar member is in the first position, and the rotatable arm moves freely when the bar member is in the second position, wherein, when the pin is disposed in the pin hole, and the bar member is in the second position, the pin maintains the bar member in the second position.

14 Claims, 6 Drawing Sheets

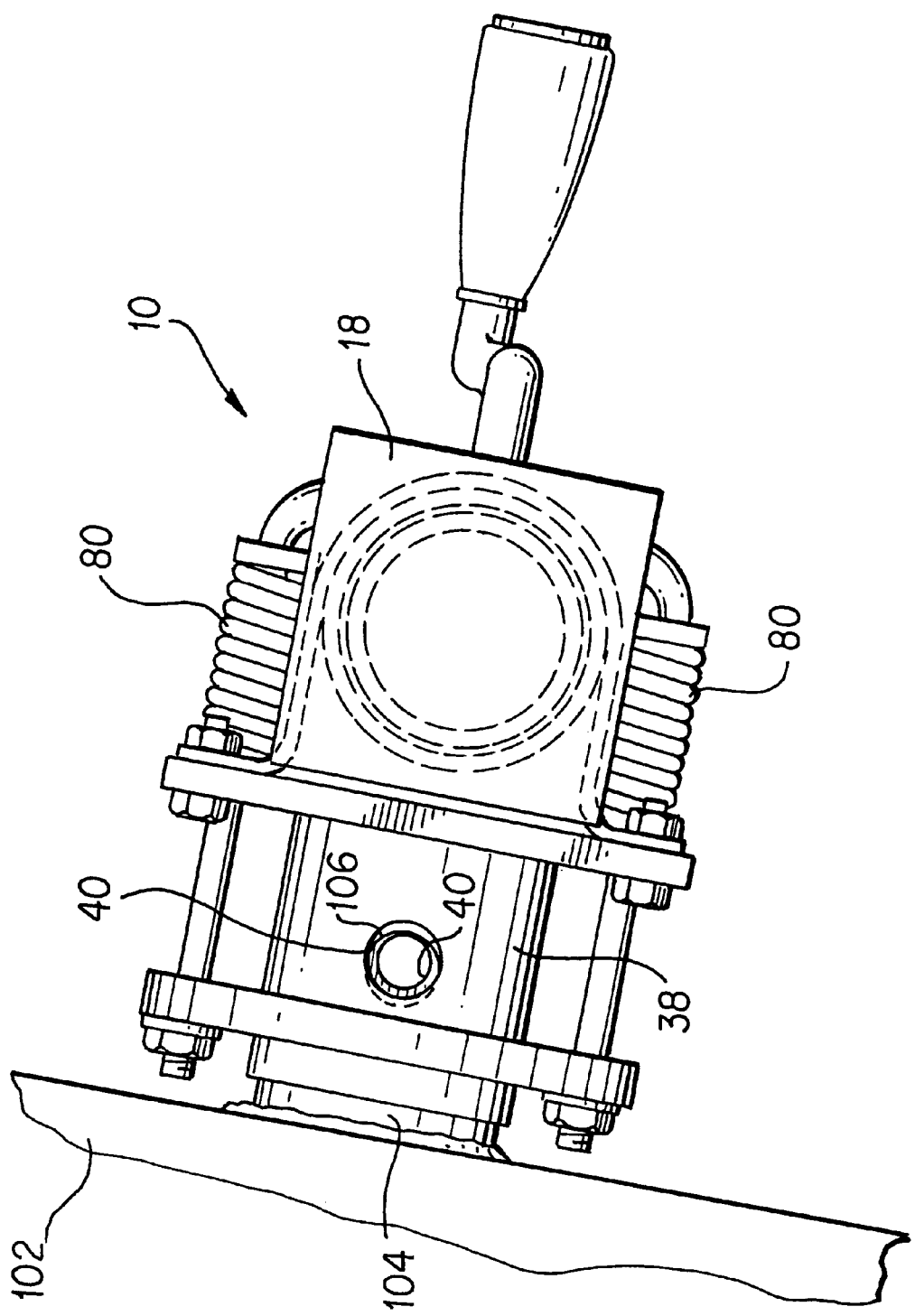

IMPLEMENT JACK LOCK-OUT DEVICE

FIELD OF THE INVENTION

This invention relates to removable jacks removably attached to the hitch of a work implement such as, for example, a round baler. More particularly, the invention relates to a jack assembly with a lock-out device. The lock-out device is constructed to render the jack operable only when the jack has been properly connected to the hitch of the work implement.

BACKGROUND OF THE INVENTION

In the art of manufacturing towable work implements and other towed vehicles, such as agricultural round balers and the like, typically a tongue or hitch is connected to the main frame of the device so that the tongue or hitch can be connected to a self-propelled vehicle such as a tractor, truck, car, etc. As is commonly known, towable work implements and other towed vehicles have two or more wheels rotatably connected to the main frame so that the device can roll along firm surfaces when attached to and pulled by a self-propelled vehicle. While the tongue or hitch is connected to the self-propelled vehicle, the vehicle supports it. On the other hand, when the tongue or hitch is disengaged from the self-propelled vehicle, the tongue or hitch is free to fall to the ground. To prevent damage to the tongue or hitch, a removable jack is frequently attached to the tongue or hitch and the jack is used to move and maintain the tongue or hitch off the ground in a storage position. The jack is manufactured to be removable from the tongue or hitch so as not to interfere with the operation of the work implement or possibly get damaged during operation of the work implement. Such jacks are used, for example, with agricultural vehicles such as a round baler used for picking up hay, grass, or other cut crop material to make a bale.

One drawback to having a removable jack is that the jack can be improperly attached to the tongue or hitch due to human error. When this occurs, there is a danger that the jack will spontaneously detach and fall away from the tongue or hitch especially when the jack is adjusted by an operator. In the event that the jack detaches from the tongue or hitch during use, there is the risk that the work implement operator or bystander could be injured by the falling tongue or hitch and the falling jack. Such accidents are not uncommon and at least one European country has enacted regulations requiring that each detachable jack for a work implement, such as a round baler, be equipped with a failsafe lock-out mechanism. The failsafe lock-out mechanism ideally would render the jack operable only when the jack is properly connected and secured to the tongue or hitch of the work implement. In other words, the lock-out mechanism would render the jack inoperable when the jack is not properly connected and secured to the tongue or hitch.

The present invention endeavors to provide an improved detachable jack assembly for a towable work implement that includes a failsafe lock-out mechanism that maintains the advantages of the prior art detachable jacks while overcoming the drawbacks of the prior art devices.

Accordingly, an object of the present invention is to overcome the disadvantages of the prior art detachable jacks.

Another object of the present invention is to provide a detachable jack assembly for attaching to the tongue or hitch of a towable work implement or other towed vehicle wherein the jack assembly includes a failsafe lock-out mechanism that permits operation of the jack only when the jack is properly attached and secured to the tongue or hitch.

Another object of the present invention is to provide a detachable jack assembly for attaching to the tongue or hitch of a towable work implement or other towed vehicle wherein the jack assembly includes a failsafe lock-out mechanism that prevents operation of the jack whenever the jack is not properly attached and secured to the tongue or hitch.

Another object of the present invention is to provide a detachable jack assembly with failsafe lock-out mechanism that is simple and economical to manufacture.

Another object of the present invention is to provide a detachable jack assembly with failsafe lock-out mechanism that is durable and easy to maintain.

SUMMARY OF THE INVENTION

In accordance with the above objectives, the present invention provides in a first preferred embodiment a detachable jack assembly for attaching to a hitch of a work implement or vehicle, comprising: (a) a leg having a first member movably connected to a foot member; (b) a crank assembly disposed on the first member and having a rotatable arm, wherein the crank assembly is operably connected to the first member to move the foot member relative to the first member when the rotatable arm is rotated; (c) an attachment member disposed on the first member and configured to attach to a hitch of a work implement or vehicle, the attachment member having a pin hole formed therein; (d) a pin configured to fit in the pin hole; and (e) a lock-out assembly disposed on the attachment member, comprising a bar member biased to a first position and movable to a second position, wherein the rotation of the rotatable arm is limited by the bar member when the bar member is in the first position, and the rotatable arm moves freely when the bar member is in the second position, wherein, when the pin is disposed in the pin hole, and the bar member is in the second position, the pin maintains the bar member in the second position.

In accordance with a second embodiment, the first preferred embodiment is further modified so that the lock-out assembly further comprises a sliding ring having a main hole formed therein, and the bar member is U-shaped and includes two arm portions connected together by a central portion, wherein each arm portion is connected to the sliding ring and the sliding ring is disposed with the attachment member extending through the main hole so that the sliding ring is slidable on the attachment member.

In accordance with a third embodiment, the second preferred embodiment is further modified so that the lock-out assembly further comprises a spring disposed on each arm portion so as to bias the bar member to the first position.

In accordance with a fourth embodiment, the second preferred embodiment is further modified so that the two arm portions of the bar member straddle the first member of the leg.

In accordance with a fifth embodiment, the first preferred embodiment is further modified so that the rotatable arm rotates along a path of rotation and the bar member obstructs the path of rotation when in the first position so as to limit the movement of the rotatable arm.

In accordance with a sixth embodiment, the second preferred embodiment is modified to further comprise a base plate connected to the first member and to the attachment member, the base plate including two throughholes formed therein, wherein each throughhole is dimensioned to receive and guide one of the two arm portions that extends therethrough. Each arm portion preferably comprises a spring stop and the spring of each respective arm portion is a compressive spring disposed around the arm portion between the spring stop and the base plate.

In accordance with a seventh embodiment, the sixth preferred embodiment is further modified so that the sliding ring is disposed on the attachment member between the pin hole of the attachment member and the base plate when the bar member is in the first position.

In accordance with an eighth embodiment, the sixth preferred embodiment is further modified so that the sliding ring is disposed on the attachment member so that the pin hole is between the sliding ring and the base plate when the bar member is in the second position.

In accordance with a ninth embodiment, the first preferred embodiment is further modified so that the pin has a wide end portion dimensioned to be wider than a diameter of the pin hole to maintain the pin in the pin hole.

In accordance with a tenth embodiment, the eighth preferred embodiment is further modified so that the pin has a wide end portion dimensioned to be wider than a diameter of the pin hole, and the pin provides a stop to prevent the sliding ring from leaving the second position when the bar member is in the second position.

Further objects, features and advantages of the present invention will become apparent from the Detailed Description of the Preferred Embodiments, which follows, when considered together with the attached drawings.

BRIEF DESCRIPTION OF THE DRAWINGS

FIG. 3 is a top view of the jack assembly of FIG. 1 attached to the tongue of a work implement.

DETAILED DESCRIPTION OF THE PREFERRED EMBODIMENTS

Figure 1:
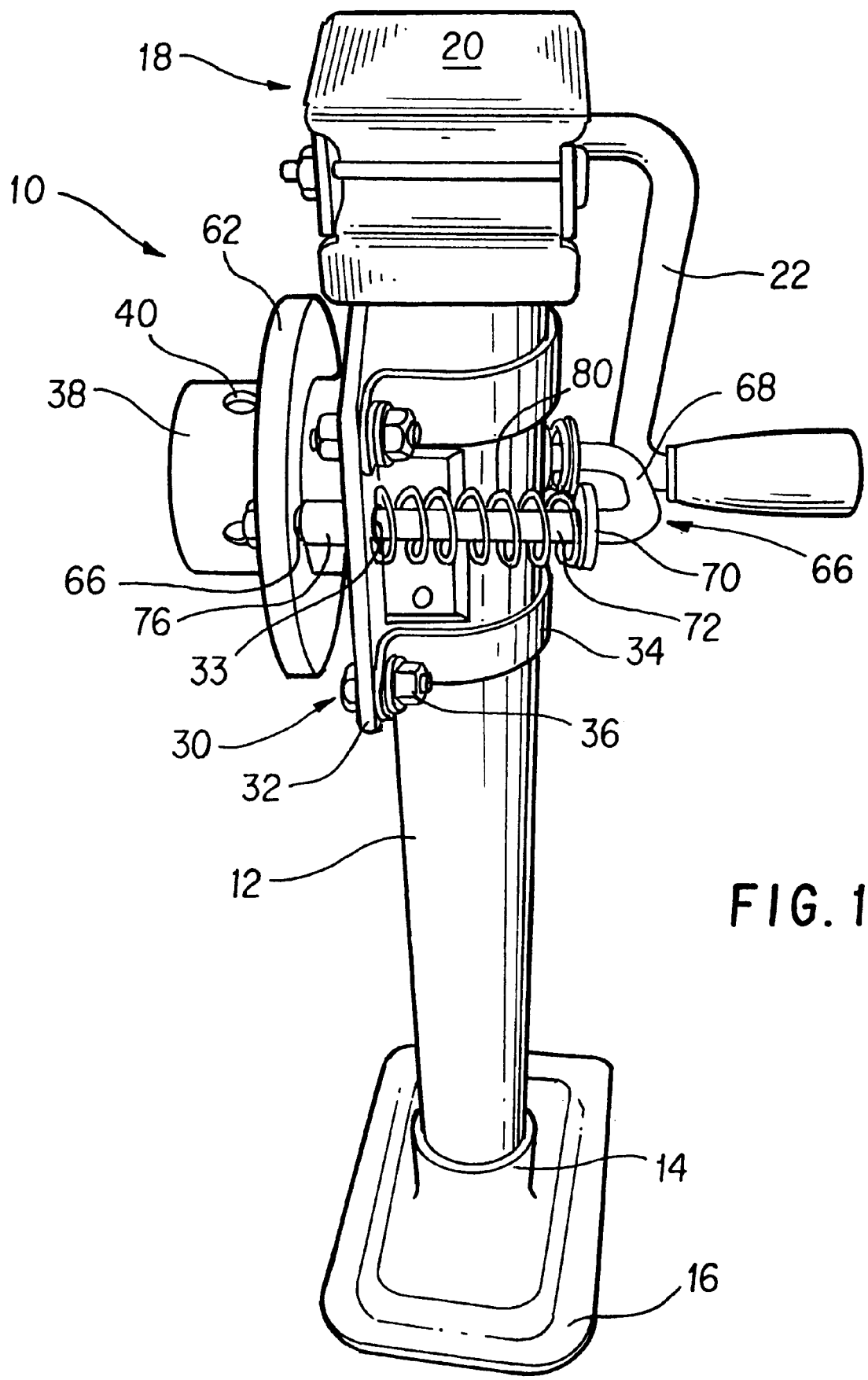
FIG. 1 is a front perspective view of a jack assembly including the lockout device of the present invention.
Figure 2:
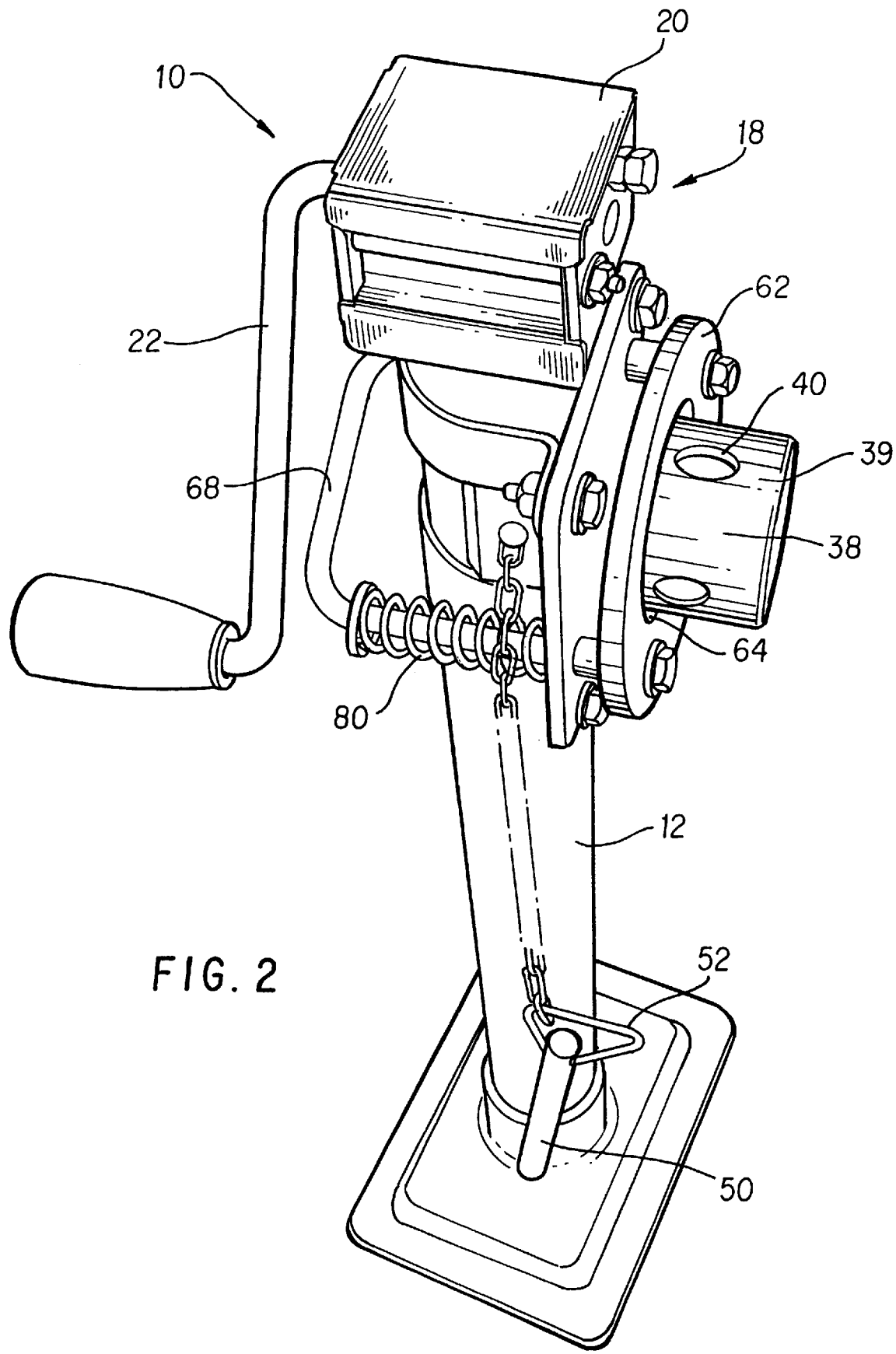
FIG. 2 is a rear perspective view of the jack assembly of FIG. 1.

The preferred embodiments of the invention will now be described with reference to the Figures in which like parts are indicated by like reference numerals. The apparatus of the present invention is a detachable jack assembly 10 as shown in FIGS. 1 and 2. Jack assembly 10 includes a hollow, elongated cylindrical leg member 12 having a circular cross section in which an elongated foot member 14 is disposed so that the leg member can be jacked or slide along the foot member as is conventionally known. Collectively, the leg member 12 and the foot member 14 can be referred to as a "leg." Preferably, the foot member 14 has a ground plate 16 attached to the lower end of the foot member for providing a stable base for the jack assembly 10. The leg member 12 and the foot member 14 can be constructed to have other elongated geometries with triangular, rectangular, elliptical, etc. cross sections without departing from the scope of the present invention.

A crank assembly 18 is connected to the leg member 12, preferably at or near the uppermost end portion of the leg member. Crank assembly 18 includes a crank housing 20, a crank mechanism (not shown) disposed in the crank housing 20, and a rotatable actuating arm 22 extending into the crank housing 20 and connected to the crank mechanism so that manually rotating actuating arm 22 activates the crank mechanism that operates to move or jack the foot member 14 relative to the leg member 12 as is generally known in the art of manufacturing jacks. One example of a suitable crank mechanism is disclosed in U.S. Pat. No. 5,553,825 to Rasmussen, which is incorporated herein by reference in its entirety. However, one of ordinary skill in the art will recognize that numerous other crank mechanisms, can be successfully applied in the jack assembly of the present invention.

Figure 4A:
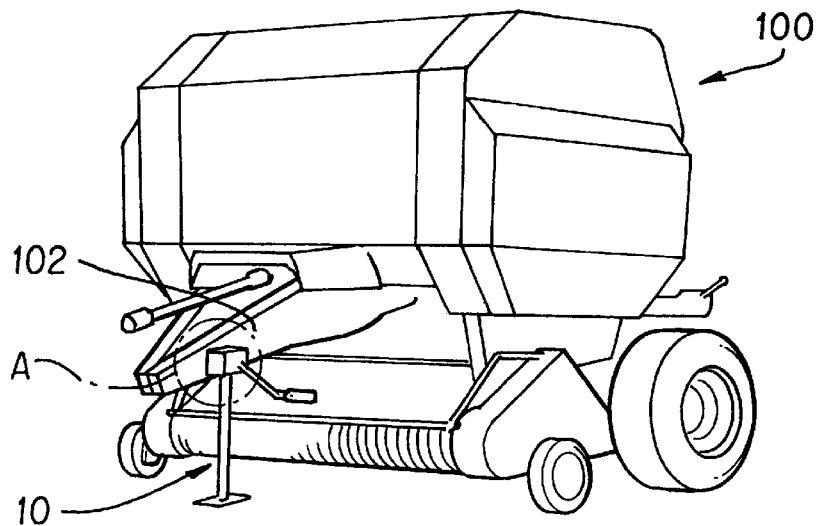
FIG. 4A is a perspective view of a work implement with the jack assembly attached to the tongue.
Figure 4B:
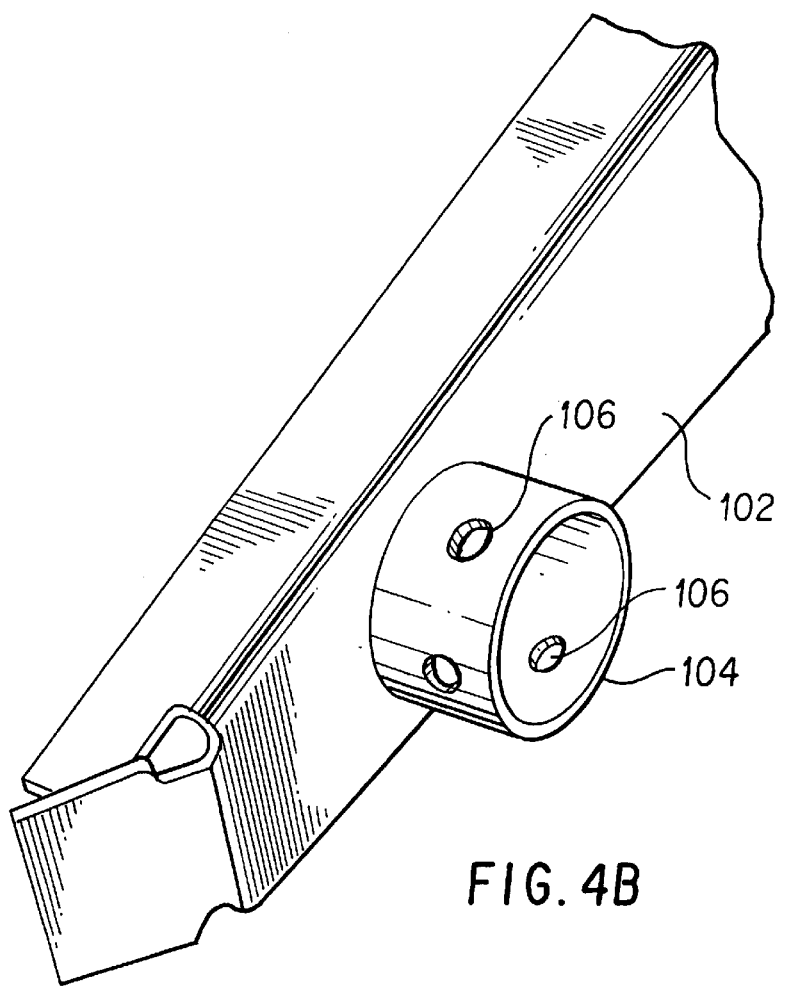
FIG. 4B is a close up view of the attachment site on the tongue of the work implement.

Jack assembly 10 also includes an attachment assembly 30 for attaching to a corresponding attachment site on a tongue or hitch of a work implement or vehicle. Attachment assembly 30 includes a base plate 32 connected to leg member 12 using bands 34 secured to plate 32 using fasteners 36 such as bolts or screws. Base plate 32 can also be connected to leg member 12 by welding, brazing or other suitable methods. Attachment member 38 is integrally connected to base plate 32. Attachment member 38 is configured to matingly engage an attachment site 104 on a tongue or hitch 102 of a work implement 100 or other towable vehicle as shown in FIGS. 4A and 4B. Attachment member 38 is a hollow tube with an inner diameter that is slightly larger than the outer diameter of the attachment site 104 so that the attachment member 38 can slide over and matingly engage attachment site 104. Attachment member 38 also includes a pair of linearly aligned pin holes 40 formed therein as shown in FIG. 3. Attachment site 104 also includes a corresponding pair of linearly aligned pin holes 106 (only one shown in FIG. 3) that are positioned on the attachment site so as to align with pin holes 40 when attachment member 38 is matingly engaged and properly positioned with attachment site 104.

When attachment member 38 is matingly engaged and properly positioned with respect to attachment site 104 so as to place pin holes 40 in alignment with pin holes 106, an elongated securing pin 50 can be pushed into place and positioned so as to extend through each one of the aligned pin holes 40 and pin holes 106. Pin 50 is dimensioned so as to have an elongated axial length that is greater than the diameter of the attachment member 38 so that when pin 50 is disposed in the pin holes 40 and 106, both ends of pin 50 extend beyond the outer surface of attachment member 38. Thus, when pin 50 extends through each one of the aligned pin holes 40 and 106, the jack assembly 10 is properly secured to tongue or hitch 102.

To ensure that the jack assembly 10 will be properly attached and secured to tongue or hitch 102, the jack assembly 10 is provided with a failsafe lock-out assembly, which serves to prevent operation of the jack assembly when the jack assembly is not properly secured to the tongue or hitch of the work implement and which does not interfere with the operation of the jack assembly when the jack assembly is properly secured to the tongue or hitch. Lock-out assembly is disposed on the attachment member 38 and includes a sliding ring 62 that has a main hole 64 formed therein. The sliding ring 62 is disposed on the attachment member 38 so that the attachment member 38 extends through the main hole 64. Main hole 64 is dimensioned to be larger than the outer diameter of attachment member 38 so that the sliding ring 62 may slide easily along the length of attachment member 38.

Lock-out assembly also includes a roughly U-shaped bar member 66 having a central portion 68 defined between two spring stops 70, and an arm portion 72 extending from each spring stop 70. The base plate 32 is provided with two throughholes 33 dimensioned so that each through hole 33 receives one arm portion 72 that extends therethrough. Base plate 32 serves as a guide for the arm portions 72. Arm portions 72 also extend through a respective throughholes 63 formed in the sliding ring 62, and each arm portion is connected to sliding ring 62, preferably by providing each arm portion with a threaded tip that can threadingly engage a nut; however, each arm portion could be connected to the sliding ring by welding.

As shown in FIGS. 1 and 2, the roughly U-shaped bar member 66 is positioned so that the arm portions 72 straddle the leg member 12. The sliding ring 62 and the bar member 66 move together as a single sliding bar unit 74 so that the sliding ring 62 is slidable along the attachment member 38 and the arm portions 72 are slidable through throughholes 33. A spacer 76 can be placed on each arm portion 72 between the sliding ring 62 and base plate 32 so as to prevent abutment between the sliding ring and the base plate.

Each arm portion 72 is provided with a biasing compression spring 80 disposed axially on the arm portion so as to abut stop 70 on one end and to abut the base plate 32 on the other end. Thus, in this configuration each compression spring 80 provides a biasing force to move and maintain the sliding bar unit 74 in a first position as shown in FIGS. 1 and 2. The first position is the natural equilibrium position of the sliding bar unit 74 that is produced by the biasing force of compression springs 80. In other words, when the sliding bar unit 74 is in the first position, the sliding ring 62 is disposed on the attachment member 38 so as to be positioned between the pin holes 40 and the base plate 32, and the central portion 68 of the bar member 66 is maximally displaced away from the leg member 12. When the sliding bar unit 74 is in the first position, as can be seen in FIGS. 1 and 2, the central portion 68 of bar member 66 is disposed on the path of rotation for actuating arm 22 so that actuating arm 22 is prevented from moving past the position of the central portion 68. In other words, when the sliding bar unit 74 is in the first position, the central portion 68 serves as a stop or obstruction that interferes with, limits, and prevents, free movement or rotation of the actuating arm 22.

Figure 5:
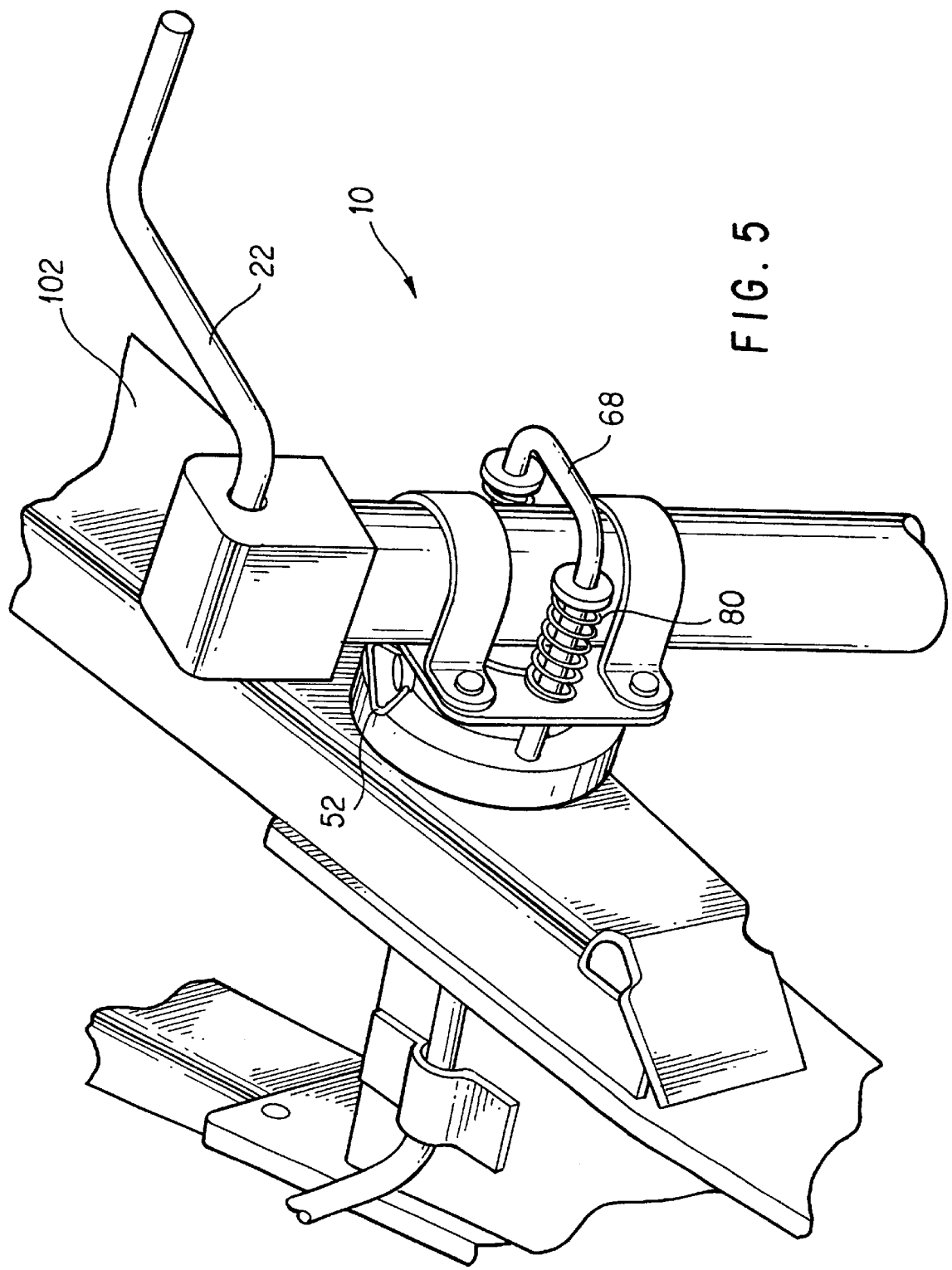
FIG. 5 is a close up view of area A in FIG. 4A when the jack assembly is properly secured to the tongue.
Figure 6:
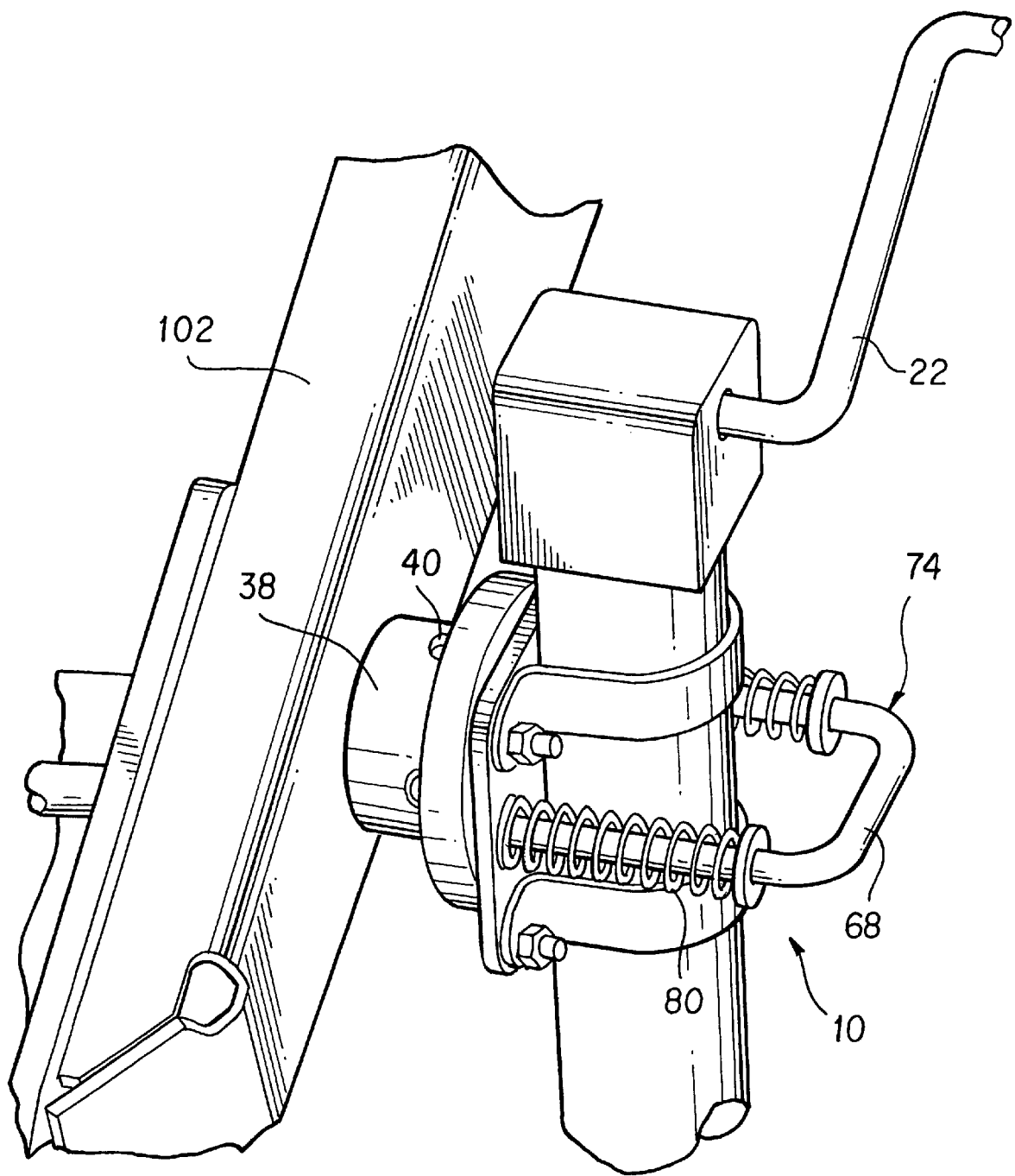
FIG. 6 is a close up view of area A in FIG. 4A when the jack assembly is not properly secured to the tongue.

To permit free rotation of the actuating arm 22, it is necessary to move the sliding bar unit 74 to a second position wherein the central portion 68 is no longer disposed on the path of rotation of the actuating arm 22. FIG. 5 illustrates this second position; wherein the sliding bar unit 74 has been shifted along the attachment member 38 so that compression springs 80 are compressed and the sliding ring 62 is disposed on the attachment member 38 so as to be positioned on an end portion 39 of the attachment member 38. When the sliding bar unit 74 is in the second position, the sliding ring 62 is disposed so that pin holes 40 are positioned between the sliding ring 62 and base plate 32 so that pin 50 can be placed to extend through holes 40 as shown in FIG. 5. When the sliding bar unit 74 is in the second position, the central portion 68 of bar member 66 is shifted closer to leg member 12 and is no longer positioned on the path of rotation of actuating arm 22. In other words, when sliding bar unit 74 is in the second position the actuating arm 22 is free to rotate in the conventional manner without hindrance from any portion of the sliding bar unit 74.

It is noted that the second position is a non-equilibrium position because the springs 80 bias the sliding bar unit 74 to return to the first position. To maintain the sliding bar unit 74 in the second position, it is necessary to place pin 50 so as to extend through pin holes 40 and pin holes 106 when the sliding bar unit is in the second position. Pin 50 includes a wide end portion 52, such as a pull ring or cotter pin, that is dimensioned to be wider that the diameter of pin holes 40 so that pin 50 will be held in place in pin holes 40 and 106 by gravity as evident from FIG. 5. Thus, pin 50 provides a stop to prevent the sliding bar unit 74 from leaving the second position while pin 50 extends through pin holes 40 and 106.

To effect the proper placement and operation of the detachable jack assembly 10 in accordance with the present invention, first the attachment member 38 is placed over the attachment site 104 so as to matingly engage the attachment site. Second, the position of attachment member 38 relative to attachment site 104 must be adjusted so that pin holes 40 and 106 are linearly aligned. Third, the sliding bar unit 74 is manually moved from the first position to the second position. Lastly, pin 50 is placed to extend through pin holes 40 and 106 so as to provide a stop to prevent the return of the sliding bar unit 74 to the first position. In other words, pin 50 maintains the sliding bar unit 74 in the non-equilibrium second position.

While the present invention has been described with reference to certain preferred embodiments, one of ordinary skill in the art will recognize that additions, deletions, substitutions, modifications, and improvements can be made while remaining within the spirit and scope of the present invention as defined by the appended claims.

What is claimed is:

1. A detachable jack assembly for attaching to a hitch of a work implement or vehicle, comprising:

a leg having a first member movably connected to a foot member;

a crank assembly disposed on the first member and having a rotatable arm, wherein the crank assembly is operably connected to the first member to move the foot member relative to the first member when the rotatable arm is rotated;

an attachment member disposed on the first member and configured to attach to a hitch of a work implement or vehicle, the attachment member having a pin hole formed therein;

a pin configured to fit in the pin hole; and a lock-out assembly disposed on the attachment member, comprising a bar member biased to a first position and movable to a second position, wherein the rotation of the rotatable arm is limited by the bar member when the bar member is in the first position, and the rotatable arm moves freely when the bar member is in the second position, wherein, when the pin is disposed in the pin hole, and the bar member is in the second position, the pin maintains the bar member in the second position.

2. A detachable jack assembly as recited in claim 1, wherein the lock-out assembly further comprises a sliding ring having a main hole formed therein, and the bar member is U-shaped and includes two arm portions connected together by a central portion, wherein each arm portion is connected to the sliding ring and the sliding ring is disposed with the attachment member extending through the main hole so that the sliding ring is slidable on the attachment member.

3. A detachable jack assembly as recited in claim 2, wherein the lockout assembly further comprises a spring disposed on each arm portion so as to bias the bar member to the first position.

4. A detachable jack assembly as recited in claim 2, wherein the two arm portions of the bar member straddle the first member of the leg.

5. A detachable jack assembly as recited in claim 1, wherein the rotatable arm rotates along a path of rotation and the bar member obstructs the path of rotation when in the first position so as to limit the movement of the rotatable arm.

6. A detachable jack assembly as recited in claim 3, further comprising: a base plate connected to the first member and to the attachment member, the base plate including two throughholes formed therein, wherein each throughhole is dimensioned to receive and guide one of the two arm portions that extends therethrough.

7. A detachable jack assembly as recited in claim 6, wherein each arm portion comprises a spring stop and the spring of each respective arm portion is a compressive spring disposed around the arm portion between the spring stop and the base plate.

8. A detachable jack assembly as recited in claim 6, wherein the sliding ring is disposed on the attachment member between the pin hole of the attachment member and the base plate when the bar member is in the first position.

9. A detachable jack assembly as recited in claim 8, wherein the sliding ring is disposed on the attachment member so that the pin hole is between the sliding ring and the base plate when the bar member is in the second position.

10. A detachable jack assembly as recited in claim 7, wherein the sliding ring is disposed on the attachment member between the pin hole of the attachment member and the base plate when the bar member is in the first position.

11. A detachable jack assembly as recited in claim 10, wherein the sliding ring is disposed on the attachment member so that the pin hole is between the sliding ring and the base plate when the bar member is in the second position.

12. A detachable jack assembly as recited in claim 1, wherein the pin has a wide end portion dimensioned to be wider than a diameter of the pin hole to maintain the pin in the pin hole.

13. A detachable jack assembly as recited in claim 9, wherein the pin has a wide end portion dimensioned to be wider than a diameter of the pin hole, and the pin provides a stop to prevent the sliding ring from leaving the second position when the bar member is in the second position.

14. A detachable jack assembly as recited in claim 11, wherein the pin has a wide end portion dimensioned to be wider than a diameter of the pin hole, and the pin provides a stop to prevent the sliding ring from leaving the second position when the bar member is in the second position.

* * * * *